Apr. 17, 1923.

M. O. ALLEN 1,452,018

CLEANER FOR METER DIAL GUARDS

Filed June 6, 1922

Inventor
Malcolm O Allen

By Franks Ackerman

Attorney

Patented Apr. 17, 1923.

1,452,018

UNITED STATES PATENT OFFICE.

MALCOLM O. ALLEN, OF NEWPORT, TENNESSEE.

CLEANER FOR METER-DIAL GUARDS.

Application filed June 6, 1922. Serial No. 566,347.

*To all whom it may concern:*

Be it known that I, MALCOLM O. ALLEN, a citizen of the United States of America, and resident of Newport, in the county of Cocke and State of Tennessee, have invented certain new and useful Improvements in Cleaners for Meter-Dial Guards, of which the following is a specification.

This invention relates more particularly to meters, although it may be used in association with other devices having transparent guards for dials or the like.

It is an object of this invention to provide a wiper for the inner side of a transparent guard in order to remove frost, moisture or any vision-obstructing deposit which might be present on the surface of the guard.

Primarily, the invention was intended to facilitate the reading of water meters which in winter seasons, especially, become coated with a fog-like deposit, or the deposit may resemble mist or water resulting from condensation, thus obstructing the indicia on the dial of the meter. So troublesome does this condition become at times as to render it necessary to remove the fastenings for the top of the meter in order that the transparent dial protector or glass may be removed. Of course the foregoing consumes a great deal of time and is annoying.

The present invention is designed to obviate the necessity for the foregoing and to facilitate the reading of the meters.

A further object of this invention is to produce a guard cleaner which may be easily applied to meter constructions now in common use, the said device being efficient and comparatively inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
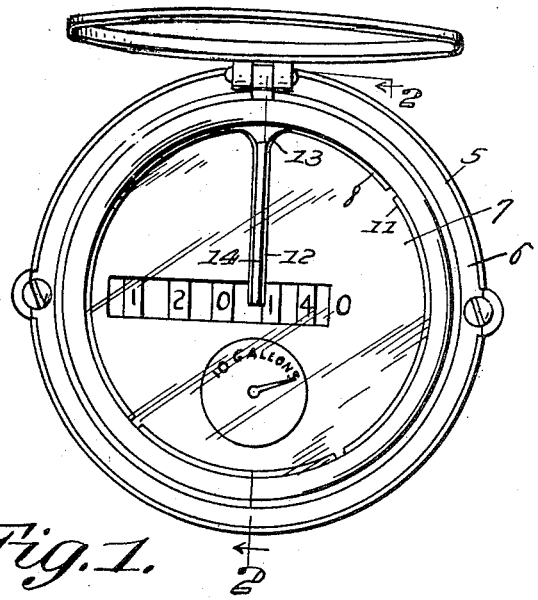
Figure 1 illustrates a view in elevation of a face of a meter showing a device embodying the invention applied thereto.
Figure 2:
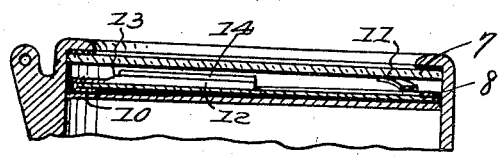
Figure 2 illustrates a sectional view on the line 2—2 of Fig. 1 with the cover removed.
Figure 3:
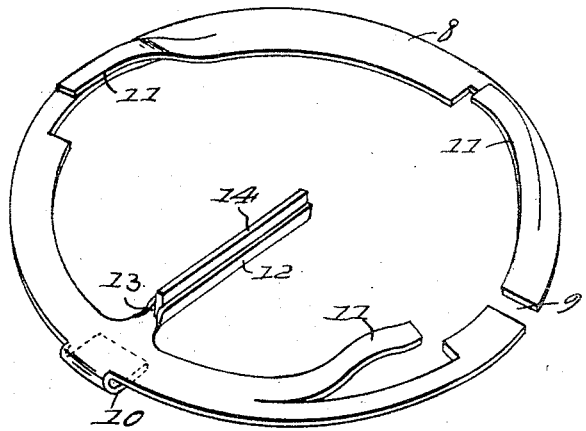
Figure 3 illustrates a perspective view of the device detached from the meter.

In these drawings 5 denotes the meter casing, 6 the retainer for the transparent guard 7, which parts are of conventional type and need not be described in detail. In fact, these parts may be of any ordinary construction, and it is the purpose of the inventor that this invention shall be used with different types of meters or dial guards.

The guard cleaner, in the present embodiment of the invention, comprises what might be termed a "ring" 8, which is preferably split to produce a joint 9 in order that the ring may be sprung into position to facilitate its application to or installation in a meter casing. The ring is also preferably provided with a lug or ear 10 which is shaped to underlie the ring in slightly spaced relation to the ring, and it is preferably formed integral with the ring and it is intended to embrace the dial so that it will be anchored in place against rotation. The ear acts as one member of a clip for exerting friction on the dial, although, in many instances, this anchorage might not be necessary.

The ring has yieldable fingers 11 preferably struck therefrom and bent to lie outside or above the surface of the ring, and these fingers constitute supports for the dial guard which, as has been stated, is usually made of glass.

A radial arm 12 is preferably formed integral with the ring and it is shaped to form a channel 13 or seat for a wiping element 14, preferably in the nature of a body or strip of rubber, although the inventor does not wish to be limited with respect to the character or material comprising the said wiper.

The fingers are in such relation to the other parts of the device as to hold the guard in slightly spaced relation to the operating surface of the wiper, but the fingers are, of course, yieldable and an operator may, by exerting pressure with his finger on the outer surface of the guard, press it into engagement with the wiper and then by imparting rotary motion to the guard, can wipe or remove deposits from the inner surface of the guard.

The construction and operation will, it is thought, be understood from the foregoing description, and the efficiency of the device will, it is thought, be recognized by those skilled in the art.

I claim:

1. In a cleaner for meter dial guards, an element adapted to be secured in front of a meter dial, yieldable members thereon for engaging the dial guard in spaced relation to the dial, and a wiper interposed between the guard and dial against which the guard may be pressed and with relation to which it may be rotated for removing deposits from its inner surface.

2. In a cleaner for meter dial guards, a yieldable split ring and outwardly extending integral spring fingers adapted to be interposed between a dial and its guard, and a radially extending wiper held by said ring.

3. In a cleaner for meter dial guards, a ring having outwardly and circumferentially extending integral fingers adapted to be seated between a dial and its guard, a radial arm on the said ring, and a wiper carried by the arm.

4. In a cleaner for meter dial guards, a ring having an ear integral therewith and shaped to extend partially across its back to form a seat, spring fingers extending from the opposite side of the said ring, and a wiper carried by the said ring.

5. In a cleaner for meter dial guards, a ring having an ear integral therewith and shaped to extend partially across its back to form a seat, spring fingers extending from the opposite side of the said ring, a radially extending arm integral with the ring, and a wiper on the said arm.

MALCOLM O. ALLEN.